UNITED STATES PATENT OFFICE.

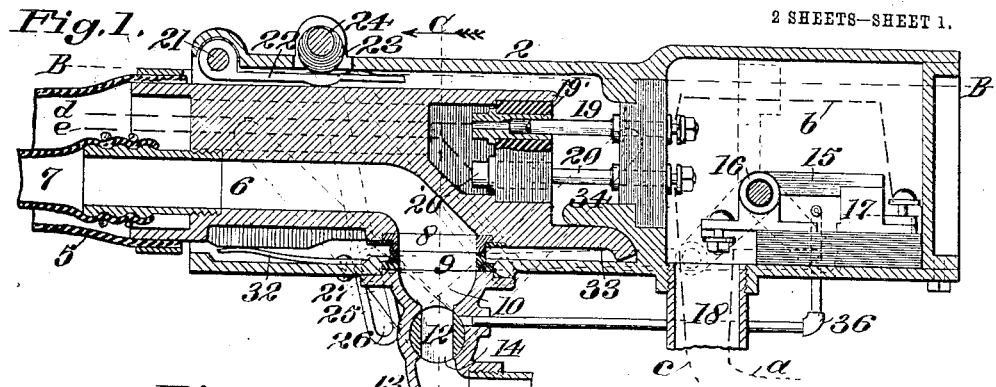

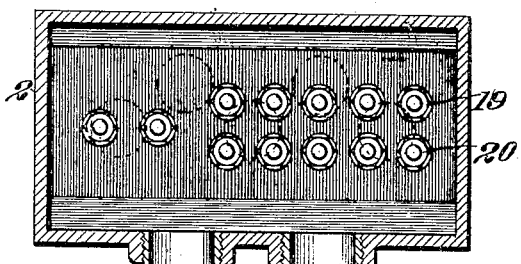
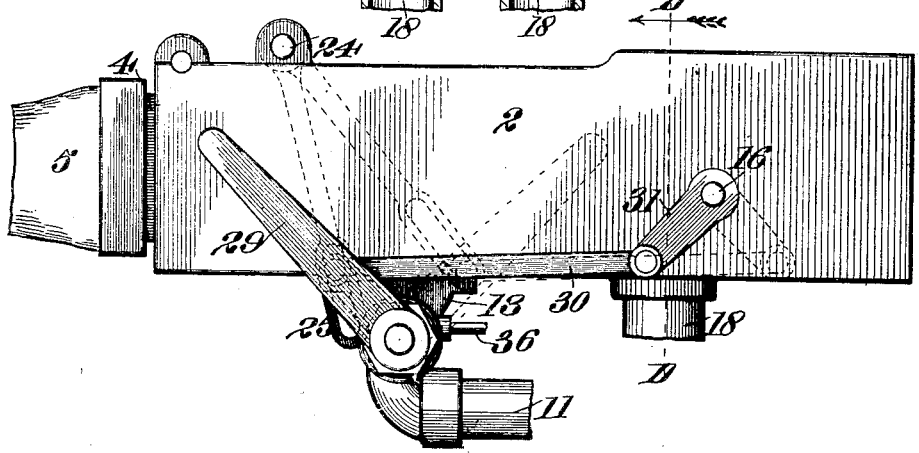
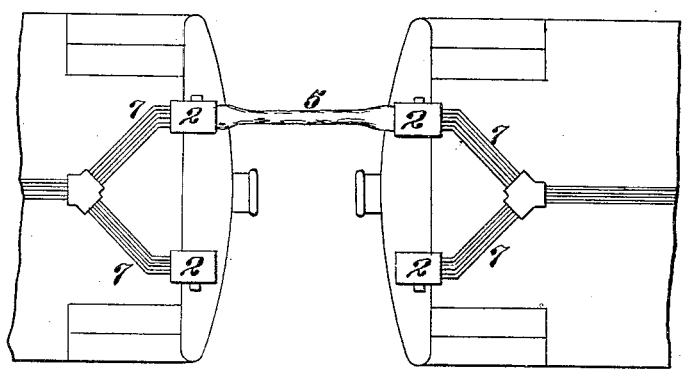

BUELL C. NELSON, OF OAKLAND, CALIFORNIA, ASSIGNOR OF ONE-HALF TO WARREN GREGORY, OF BERKELEY, CALIFORNIA.

AIR AND ELECTRIC COUPLING FOR RAILROAD-TRAINS.

1,118,571.   Specification of Letters Patent.   Patented Nov. 24, 1914.

Application filed December 27, 1912. Serial No. 738,784.

*To all whom it may concern:*

Be it known that I, BUELL C. NELSON, a citizen of the United States, residing at Oakland, in the county of Alameda and State of California, have invented new and useful Improvements in Air and Electric Couplers for Railroad-Trains, of which the following is a specification.

This invention relates to a combined air and electric coupler for railroad trains.

It is the object of this invention to provide a coupler for connecting the air lines and electric conductors on railroad trains between the adjacent cars, and by means of which the air lines and electrical circuits may be either connected or disconnected simultaneously.

A further object is to provide an air and electric coupler which is simple in construction and which can be easily and quickly operated by the trainmen without necessitating a dangerous kneeling posture between cars, as is now generally practised in coupling and uncoupling the air and electric lines.

Other objects and advantages of this invention will appear hereinafter.

The invention primarily resides in a header adapted to be mounted on the ends of a car and in which the air pipes and electric conductors terminate, a jumper having a flexible central portion carrying end members adapted to be connected to the headers, and provided with air and electrical conductors arranged to form a continuation of the conductors terminating in the headers, means for locking the terminals of the jumpers in the headers, cut-off valves arranged in the headers controlling the passage of air therethrough, switches in the headers controlling the passage of electrical current therethrough, and means for operating the switches, valves, and jumper locking means on each header by one operation.

The invention further consists of the parts and the construction and combination of parts as hereinafter more fully described and claimed, having reference to the accompanying drawings, in which—

Figure 1 is a longitudinal vertical section of the invention on the line A—A of Fig. 2. Fig. 2 is a horizontal section on the line B—B of Fig. 1 with parts removed. Fig. 3 is a vertical section on the line C—C of Fig. 1. Fig. 4 is a vertical section on the line D—D of Fig. 5 with parts removed. Fig. 5 is a side elevation taken in the direction of arrow E in Fig. 3. Fig. 3 is a diagrammatic plan view illustrating the application of the invention. Fig. 7 is a detail showing a modified form of the jumper construction. Fig. 8 is a section on the line F—F of Fig. 7.

In the drawings the header portion of the device is indicated at 2 and consists of a rectangular hollow casing adapted to be rigidly mounted on the end of a car at any suitable point, which casing is open at its outer end and is divided into two compartments by means of a partition 3 formed of any suitable insulating material.

The outer compartment in the header casing 2 forms a female member for the reception of the terminals of a jumper, which terminals constitute male members and are indicated at 4. The jumper terminals or male members 4 are block shaped structures formed of any suitable material, such as cast metal, which are connected together by means of a detachable flexible tube 5.

Formed in the male members 4 is a series of longitudinally extending air passages 6, the outer ends of which open to tubes 7. These passages 6 and tubes 7 correspond in number to the air conductors employed on the train, which may be of any desired number; three being shown in this case. The inner ends of the passages 6 terminate on the under side of the male members 4 and are spaced a suitable distance apart; gaskets 8 surrounding the mouth of the passages 6 being rigidly secured to the underside of the male member 4.

The gaskets 8 are designed to register with corresponding gaskets 9 mounted on the interior of the female portion of the header 2, when the member 4 is inserted in the header 2, as shown in Fig. 1.

The gaskets 9 surround the mouths of the air passages 10 leading from the underside of the header 2, which passages 10 communicate with air pipes or conduits 11 leading to and from various air-operated and controlling mechanisms on the car. The air passages 10 are arranged in transverse alinement with each other in such manner that a multiple tapered valve 12 mounted in the casing 13 of the air passage 10 will extend across each of the air passages 10. The valve 12 is provided with ports 14 which are adapted to register with the air passages 10 to allow the air to pass through the passages 10 simultaneously when the valve 12 is in its open position, and to prevent the passage of air through the passages 10 when the valve is in its closed position.

Mounted within the rear compartment formed within the header 2 is a series of knife switches 15 which are mounted on a rock-shaft 16, and which are adapted to engage spring contact members 17. As many knife switches 15 are provided on the rock-shaft 16 as there are dangerous electrical circuits employed on the car, and may be varied as occasion requires. A knife switch 15 is connected to a conductor $a$ which enters the header 2 through a cable conduit 18. The spring contact members 17 are electrically connected to plugs 19, mounted in the insulated partition 3 by means of conductors $b$. A series of plugs 20 corresponding to the plugs 19 are mounted in the insulated partition 3, and are connected to electrical conductors $c$ leading through the cable conduits 18. The conductors $a$ and $c$ lead to and from the various electrically controlled and operated mechanisms on the car.

The various knife switches 15 are so arranged on the rock-shaft 16 as to make or break circuit between the conductors $a$ and $b$ simultaneously on the operating of the rock-shaft, as will presently be described.

The plugs 19 and 20 extend horizontally from the partition 3 into the female portion of the header 2 and are designed to enter sockets 19′ and 20′, suitably mounted on the end of the male member 4 when the latter is inserted in the header 2. The sockets 19′ and 20′ connect with electrical conductors $d$ and $e$, which connect with corresponding sockets on the male member 4 at the other end of the jumper; the conductors $d$ and $e$ being formed in a flexible cable which passes through the jumper tube 5.

Pivotally mounted at 21 on the upper outer end of the header 2 is a vertically swinging spring actuated gate 22, which gate normally gravitates to a vertical position to close the open outer end of the header 2 when the male member 4 on the jumper is removed therefrom; the gate 22 being closed against the upper wall of the header 2, and held thereagainst by the male member 4 when the latter is inserted in the header 2.

Means are provided for clamping the male member 4 within the header 2 to prevent its being displaced. This means is here shown as consisting of a cam 23 mounted on a rock-shaft 24, supported in suitable bearings on the upper face of the header 2. The cam 23 extends through a slot in the header 2 and is adapted to bear against the upper face of the gate to press the latter against the male member 4, and thereby securely hold the latter in position.

Connected to one end of the rock-shaft 24 is a downwardly extending arm 25 formed with a slot 26 at its lower end. The lower end of the arm 25 is connected to the outer end of a crank 27 formed on the stem of the valve 12; a pin 28 on the crank 27 engaging the slot 26 on the arm 25 in such manner that when the valve 12 is rotated the crank 27 will act to oscillate the arm 25 and rock the shaft 24 and move the cam 23 in and out of engagement with the gate 22.

The valve 12 is provided with a hand-lever 29, by means of which the valve is operated; a link 30 connecting with the lever 29 leading to and connecting with a crank 31 on the rock-shaft 16 in such manner that when the lever 29 is actuated to operate the valve 12, the rock-shaft 16 will be operated in unison therewith to actuate the switches 15.

In the operation of the invention, when it is desired to connect the various air and electrical lines on adjacent cars, the male members 4 on the ends of the jumper are inserted in the female portions of the headers 2. The members 4 on entering the headers 2 raise the gates 22 to their open position. A plate spring 32 mounted in the bottom of the header 2 bears against the underside of the male member 4 in such manner as to normally hold the latter in such position that the gaskets 8 will move freely over the gaskets 9, out of contact therewith when the members 4 are being inserted in or withdrawn from the headers 2.

Mounted on the outer ends of the members 4 are downwardly curved guide flanges 33, so arranged as to be engaged by horizontally extending flanges 34 formed in the headers 2; the flanges 33 and 34 coöperating when the members 4 are inserted in the header 2 to insure the plugs 19 and 20 registering with the sockets 19′ and 20′, and also causing the members 4 to move downward a short distance in opposition to the spring 32 to bring the gaskets 8 into contact with the gaskets 9. After the members 4 of the jumper have been placed in position in the respective headers 2 on adjacent cars, the hand-levers 29 on the headers 2 are operated to open the valves 12, close the switches 15, and operate the rock-shaft 24 to throw the cam 23 against the upper face of the gate 22; the cams 23 acting to force the members 4 downward in opposition to the springs 32, thereby forcing the gaskets 8 tightly against the gaskets 9, and clamping the members 4 against removal from the headers 2.

When it is desired to disconnect the jumper from the headers in breaking up a train, or separating the cars, the hand-levers 29 are moved in such direction as to turn the valves 12 a half revolution into their closed position to cut off the passage of air from the conduits 11. This movement of the levers 29, transmits a rocking movement to the rock-shaft 16 through the link 30, thereby throwing the switch members 15 out of contact with the spring contact members 17 to break electrical circuits simultaneous with the closing of the air circuits. The rocking of the valve 12 also rocks the crank 27 thereon so as to move the cams 23 out of engagement with the gates 22, and release the male members 4 from their clamped position. The male members 4 on the jumper may then be readily withdrawn from the headers 2, thus effecting the disconnection of the air and electrical lines on the adjacent cars. When the male member 4 has been withdrawn from the header 2, the gate 22 returns to its closed position, thereby preventing the admission of dust or moisture to the interior of the header 2 through its outer end.

From the foregoing it will be seen that the jumper can not be removed from the header until after the air valve 12 is closed, and the switches 15, controlling the electrical circuits, are opened; and that the air and electrical connections can not be completed until the jumpers are clamped in place by the opening of the valves 12 and the closing of the switches 15. Hence, since no current can be obtained from any exposed part of the header, the employees or others handling the header or jumper may do so with safety and without fear of electric shock, thus obviating the need of lowering trolleys for this purpose. This arrangement is particularly advantageous in that it is safer than the present method of kneeling in a dangerous position between connected cars to couple the air hose, reaching through the drawheads to open the air cocks at a risk of mangling the hands and arms, and inserting and withdrawing the bus line jumpers at a risk of serious injury from electric shocks by contact with a jumper which might be charged.

The use of this invention saves time, hence, reduces cost of labor in making up and cutting down the trains, and in substituting in trains a good car for a disabled one. It is advantageous not only in the less time required for its operation and in its safety, but also in its automatic insurance against the overlooking of an air cock or switch, as the ability of the conductor to air signal from rear car to motorman's cab guarantees that every cock between cars is open, every switch closed, and every coupler locked in place, because the identical movements which make the air signal communication possible insure the rest being automatically effected. Likewise the withdrawal of the male members of a jumper from the header is a guarantee of proper closing of the cocks and opening of the switches, because the same movements required to release the jumper will automatically and simultaneously effect the rest.

As a means for blowing out the spark induced by the breaking of the circuit between the knife switches 15 and the contact members 17, a pipe 36 is provided which leads from a point adjacent the valve 12 and opens to the space rearward of the partition 3 in the header 2 at a point to one side of the switches 15, in such manner that ports in the valve 12 will, when the valve 12 is operated to cut off the passage 10, discharge a blast of air through the pipe 36 into the header 2, crosswise thereof so as to break any arc which might be formed by the opening of said switches 15.

If desired, the passages 6 in the members 4 may converge to an externally threaded partition tube 37, as shown in Fig. 7, to which a single partition hose 38, formed as shown in Figs. 7 and 8, may be connected by means of a threaded sleeve or union 39. This arrangement facilitates connecting the air lines from one male member 4 to the other in the jumpers, making the jumper light, compact and flexible.

The coupler hereinbefore described, is particularly adapted to be placed near the sides of a car, as shown in Fig. 6, being preferably placed at a convenient point which will not necessitate the workman kneeling between the cars or reaching under the drawheads to couple the hose, nor the reaching through the drawheads to open or close the air cocks.

It is manifest that in order to carry the unused air and electrical couplers on the first and last cars of a train, it will be necessary to use a dummy male member corresponding to the hereinbefore described male member.

Having thus described my invention, what I claim and desire to secure by Letters Patent, is—

1. In an air and electric coupler for trains, a header to be mounted on a car, a series of air passages leading to the header connecting with the air lines on the car, a multiple valve for controlling the flow of air through said passages, a hand-lever for operating the valve, a detachable male member having air passages adapted to register with the before-mentioned air passages, electrical conductors leading into the male member, electrical conductors leading into the header, means for connecting the conductors in the header with those in the male member, means to lock the male member to the header, a switch in the header for breaking the circuit through the conductors, and means whereby the operation of the valve will operate the switch and actuate said locking means.

2. In an air and electric coupler for trains, a header to be mounted on a car, a series of air passages leading to the header connecting with the air lines on the car, a multiple valve for controlling the flow of air through said passages, a hand-lever for operating the valve, a detachable male member having air passages adapted to register with the before-mentioned air passages, electrical conductors leading into the male member, electrical conductors leading into the header, means for connecting the conductors in the header with those in the male member, a switch in the header for breaking the circuit through the conductors, means whereby the operation of the valve will operate the switch, and means controlled by the operation of the valve for securing the male member to the header or releasing it therefrom.

3. In an air and electric coupler for trains, a jumper comprising a male member having air passages formed therein, a series of sockets in the male member, in combination with a header to be mounted on a car having air passages adapted to register with the air passages in the male member of the jumper, plugs in the header engageable with the sockets in the male member, electrical conductors leading from said plugs, a switch in the header to break the circuit through the conductors, an air valve to control the header air passages, means for locking the male member in the header, and instrumentalities whereby operation of said valve will cut off the passage of air to the male member and break the electrical circuit and actuate said locking means.

4. In an air and electric coupler for trains, a header comprising a hollow casing open at its outer end, a series of electrically conducting plugs arranged horizontally within the casing, electric conductors leading from said plugs, switches in the header connected to and controlling the flow of current through said conductors, air passages in said header connecting with the air conduits on the car, a multiple valve in said air passages, and means whereby the closing of the valve will simultaneously open the switches, and the opening of the valve will close the switches.

5. In an air and electric coupler for trains, a header comprising a hollow casing open at its outer end, a series of electrically conducting plugs arranged horizontally within the casing, electric conductors leading from said plugs, switches in the header connected to and controlling the flow of current through said conductors, air passages in said header connecting with the air conduits on the car, a multiple valve in said air passages, means whereby the closing of the valve will simultaneously open the switches, and the opening of the valve will close the switches, a male member insertable in the open outer end of the header having air passages arranged to communicate with the air passages in the header, sockets in the male member engageable with the plugs in the header, and means whereby upon closing of the valve the male member will be clamped within the header.

6. In an air and electric coupler for trains, a header comprising a hollow casing open at its outer end, a series of electrically conducting plugs arranged horizontally within the casing, electric conductors leading from said plugs, switches controlling the flow of current through said conductors, air passages in said header connecting with the air conduits on the car, a multiple valve in said air passages, means whereby the closing of the valve will simultaneously open the switches, and the opening of the valve will close the switches, a male member insertable in the open outer end of the header having air passages arranged to communicate with the air passages in the header, sockets in the male member engageable with the plugs in the header, means for clamping the male member within the header, and means whereby opening of the valve effects the clamping of the male member within the header and simultaneous closing of the switch.

7. In an air and electric coupler for railroad trains, a header comprising a casing open at its outer end and having a series of air passages opening on its interior, a single valve for controlling the flow of air through said passages, a male member insertable in the outer end of the header having air passages arranged to communicate with the first mentioned air passages, electrical connections between said header and member, means to break the circuit through said electrical connections, means whereby the operation of the valve to close the air passages will clamp the male member within the casing and whereby the opening of the valve will operate said circuit breaking means and will release the male member including a rock-shaft on the header, a cam on said rock-shaft for clamping the male member in the header, an arm on said rock shaft, and connections between said arm and the valve by which the rock shaft is rocked on the operation of the valve.

8. In an air and electric coupler for railroad trains, a header comprising a casing open at its outer end having a series of air passages opening to its interior and leading from its underside, a multiple valve for controlling the flow of air through said passages, a male member insertable in the outer end of the header having air passages arranged to communicate with the before-mentioned air passages, means whereby the operation of the valve to open the air passages will clamp the male member within the casing and whereby the closing of the valve will release the male member, including a rock-shaft on the header, a cam on said rock-shaft to clamp the male member in the header, an arm on said rock-shaft, connections between said arm and the valve by which the rock-shaft is rocked on the operation of the valve, electrical conductors in the male member, electrical conductors in the header, means for connecting said conductors when the male member is positioned in the header, and means actuated by the closing of the valve and releasing of the male member for simultaneously breaking the electrical circuit through said conductors, and whereby the opening of the valve and clamping of the male member will simultaneously complete an electrical circuit to said conductors.

9. In an air and electric coupler in combination with a pair of interengageable elements having registering air passages and engageable electrical conductors, means borne by one of the elements to control the flow of air through the air passages thereof, means borne by said element to break the circuit through said conductors, and mechanical means connected to the air controlling means and to the circuit breaking means whereby upon closing of the air controlling means said circuit breaking means will be simultaneously operated.

10. In an air and electric coupler, in combination with a header having air passages leading thereinto, and a member receivable in the header and having air passages for registry with those of the header, a valve for controlling the aforementioned passages, interchageable electrical conductors borne by said header and member, means in the header for breaking the circuit through the conductors, means to positively lock said member in the header, and means whereby when the valve is moved to closed position said locking means will be rendered inoperative and said circuit breaking means will break the circuit through said conductors.

11. In an air and electric coupler, in combination with a pair of elements having registering air passages and engageable electrical conductors, means borne by one of the elements to control the flow of air through the passages thereof, means borne by said element to break the circuit through said conductors, means borne by said element to lock the elements together, and means whereby when the valve is moved to closed position said circuit breaking means will break the circuit and unlock said locking means.

12. In combination with interengageable elements having registering air passages and electrical connections, means on one of the elements to break the circuit through the connections, means to control the air passages borne by said element, means to lock the elements together, and means whereby upon closing of the air controlling means the circuit breaking means will be actuated to break the circuit and the locking means rendered inoperative.

In testimony whereof I have hereunto set my hand in the presence of two subscribing witnesses.

BUELL C. NELSON.

Witnesses:
JOHN H. HERRING,
W. W. HEALEY.

Copies of this patent may be obtained for five cents each, by addressing the "Commissioner of Patents, Washington, D. C."